United States Patent [19]

Kohler

[11] Patent Number: 4,949,468
[45] Date of Patent: Aug. 21, 1990

[54] ROLL MEASURING DEVICE
[75] Inventor: Paul Kohler, Heidenheim, Fed. Rep. of Germany
[73] Assignee: J. M. Voith GmbH, Heidenheim, Fed. Rep. of Germany
[21] Appl. No.: 311,213
[22] Filed: Feb. 15, 1989
[30] Foreign Application Priority Data
  Mar. 2, 1988 [DE] Fed. Rep. of Germany ....... 3806640
[51] Int. Cl.$^5$ ............... G01B 5/08; G01B 7/12
[52] U.S. Cl. ............... 33/555.1; 33/783; 33/832; 33/25.3; 33/657; 33/501.02
[58] Field of Search ......... 33/178 R, 178.0, 25.1, 33/25.2, 25.3, 438, 441, 783, 812, 657, 501.02, 797, 554.3, 544.1, 555.1, 555.3, 800, 807, 798, 501.89, 832, 555

[56] References Cited
U.S. PATENT DOCUMENTS

| | | | |
|---|---|---|---|
| 1,635,908 | 7/1927 | Stuart | 33/178 R |
| 1,941,456 | 1/1934 | Arnold | 33/178 R |
| 2,306,677 | 12/1942 | Ward | 33/438 |
| 2,766,529 | 10/1956 | Dwyer | 33/25.1 |
| 3,169,323 | 2/1965 | Hold | 33/178 R |
| 3,259,254 | 7/1966 | Mitchell | 33/25.1 |
| 4,141,145 | 2/1979 | Schiffman | 33/25.1 |
| 4,176,461 | 12/1979 | Gebel et al. | 33/178 D |
| 4,389,788 | 6/1983 | Balogh et al. | 33/178 D |
| 4,473,951 | 10/1984 | Golinelli et al. | 33/783 |
| 4,597,184 | 7/1986 | Golinelli et al. | 33/178 R |

FOREIGN PATENT DOCUMENTS

| | | | |
|---|---|---|---|
| 3412253 | 3/1985 | Fed. Rep. of Germany . | |
| 1398229 | 3/1965 | France | 33/178 R |
| 1808892 | 6/1970 | German Democratic Rep. | 33/178 D |
| 2103800 | 2/1983 | United Kingdom | 33/178 R |

Primary Examiner—William A. Cuchlinksi, Jr.
Assistant Examiner—Christopher W. Fulton
Attorney, Agent, or Firm—Jeffers, Hoffman & Niewyk

[57] ABSTRACT

The invention concerns a measuring device for measuring the diameter of a rotationally symmetric body, for instance a roll, with a measuring jaw that wraps around the peripheral surface of the body and features two arms, and with two styli of which each is arranged on the free end of an arm for scanning the peripheral surface. The invention is characterized by the following features: the arms have an essentially straight-line design and the arms are constructed of rails which form a parallelogram with each other and permit swiveling in the sense of setting or retracting the respective stylus on or from the peripheral surface.

17 Claims, 3 Drawing Sheets

ROLL MEASURING DEVICE

BACKGROUND OF THE INVENTION

The invention concerns a measuring device for measuring the diameter of a rotationally symmetric body, for instance a roll, of the type having at least one straight-line arm supporting on its free end a stylus for scanning the peripheral surface of the roll, with the arm featuring at least two rails which are parallel to each other, and are components of a jointed parallelogram serving to set the stylus on the peripheral surface or lift it from it. Such a measuring device is known from the German patent disclosure 34 12 253.

Such measuring devices are needed specifically for measuring the diameter of rolls for paper machines. Such rolls need to be ground in regular intervals. In grinding, determining the diameter exactly is indispensable, requiring maximum accuracies that extend into the micron range.

Such measuring devices must meet numerous requirements. The first requirement, as mentioned, is accuracy. The limits therefore and additional requirements are listed hereafter:

1. measuring accuracy—coincidental share: 0.001 mm (fluctuation); systematic share: 0.01–0.1 mm;
2. minimal or no limitation of the operator moving space;
3. no hindrance in case of grinding wheel change, groove cutting device; adjustable from the operating station;
4. no dependency of the measuring accuracy on settings made by the operator.

SUMMARY OF THE INVENTION

The problem underlying the invention is to provide a measuring device of the type first mentioned above which flawlessly meets especially the two first-named functions. It will of necessity allow integration in an overall system which to a high degree also fulfills the other functions.

This problem is solved by the features of the present invention.

Such a roll measuring device is capable of performing the following functions:

1. it measures during grinding;
2. its measuring range can be adjusted automatically or manually permitting easy adaptation of the device to completely different roll diameters;
3. interfering temperature effects can be compensated for by coolants or temperature-controlled liquid;
4. its measuring mode is absolute, with the aid of a normal setting for each roll type or by means of an adjustable normal setting, for instance by way of a glass scale arranged on the tending side of the respective machine.

In general, two styli will be provided in a vertical arrangement for measuring shape, running truth and runout. A measuring stylus can be installed horizontally on the grinding wheel casing, making it possible to determine skewing or a bed error.

The measuring device is especially suited for application with a roll grinder. In this context, it will generally feature two arms with a stylus each arranged on the end of the respective arm.

The invention will be more fully explained with the aid of the drawings.

DETAILED DESCRIPTION OF PREFERRED EMBODIMENTS

Figure 1:
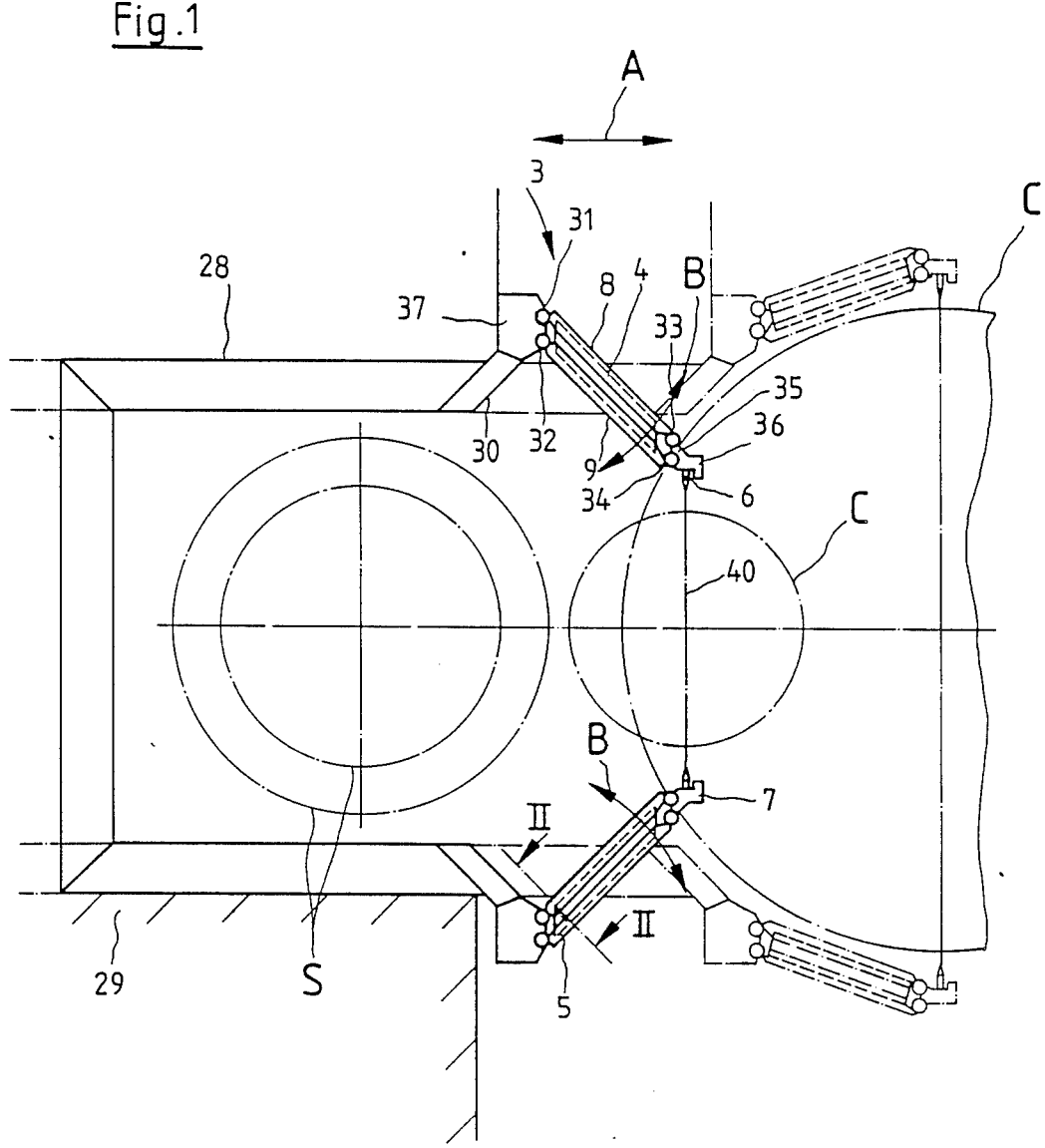
FIG. 1 shows a side elevation of a roll to be ground and measured, with measuring device and grinding wheel.

The roll C illustrated in FIG. 1 is to be ground on a roll grinder to a specific diameter, on its peripheral surface, by a grinding wheel S advancing in the axial direction of the roll.

The measuring device 3 features two arms 4.5. Contained on the free end of each arm is a stylus 6, 7. The measuring heads incorporating styluses 6 and 7 may be of any conventional type, such as that disclosed in U.S. Pat. No. 3,169,323, Hold. This patent is expressly incorporated herein by reference.

The measuring device is movable, for one, in the direction of double arrow A and, for another, the two arms 4, 5 can swivel in the direction of double arrows B. Owing to this possibility of movement, the measuring device can be adapted to rolls of various diameters. This is illustrated by the dash-dot representation of the arms 4 and 5.

The measuring device is held or mounted on a support device 28 which is mounted so as to be movable along a horizontal guideway (not illustrated here) on a base frame 29 toward the roll C and vice versa. The structure of the arms 4 and 5 can be seen from FIG. 2. Each arm is constructed of two parallel rails which essentially are identical in shape and have cross-sectionally a U-shaped profile. They are so arranged that the two open sides of the U face each other.

On their ends, the rails feature points of articulation 31, 33 and 32, 34, respectively. On the points of articulation 31 and 32 they are hinged to a retaining plate 37 which is permanently and rigidly connected with the support device 28. At the points of articulation 33 and 34 they are hinged to a coupling piece 35 that features a bracket 36 for the stylus 6 or 7. Formed thereby is a jointedly adjustable parallelogram where in swiveling the arms 4 and 5 the rails 8 and 9 remain parallel with each other and also the stylus is moved always parallel to its longitudinal axis after the fashion of a slider crank mechanism. This longitudinal axis is marked 40 in FIG. 1.

Additionally, it is favorable to provide for coupling the motion of the arms 4 and 5 in such a way with one another that in swiveling they always perform opposite swivel motions and, thus, move toward each other when adapting to rolls of smaller diameters and, of necessity, away from each other when adapting to rolls of larger diameter. The swivel angles of both arms favorably are exactly identical—although opposite. The devices required for that purpose are not illustrated in the figures.

The two rails 8, 9 are made from steel. On the outside they are encased by an insulation 10 or 11. Contained inside is a U-shaped liner 12 or 13 of copper. The purpose of the insulation 10 or 11 is to maximally prevent temperature effects on the rails 8, 9. The liners 12, 13 serve to equalize temperature differences as asymmetries occur in the stresses or temperature effects at various points of the arms. Quite important in the sense of the invention are a pressure hose 14 and two pressure bars 17, 18, favorably with a surface having a high coefficient of friction and also made from copper. These three elements extend across a major part of the length of the respective arm. Their function will yet be explained. In addition, the hollow space defined by the two U-profiles contains two sturdy, box-shaped and rigid hollow profile rails 15, 16 with channels 15', 16' for the passage of a fluid medium for purposes of temperature control. For instance, the channel 15' can have on its one end an inlet (not illustrated) and on the other end a transition line (not illustrated) to the channel 16', while the channel 16' can have an outlet (not illustrated).

The pressure hose 14 can be connected to a fluid pressurized medium, for instance compressed air, so that it can be expanded. It exerts thereby a pressure on the adjoining walls by way of its side walls, in the case of the embodiment against a face of the pressure bar 18 and on corresponding faces of the hollow profile rails 15, 16. This pressure hose thus makes it possible to achieve a mutually absolutely fixed bracing of the two rails 8, 9, so that the arm 4 or 5 will form an entirely rigid, immovable unit. Relieving the pressure hose 14 accomplishes a corresponding release of said connection. The two rails 8, 9 can now move relatively freely as against the pressure bars, and the jointed parallelogram, and thus the corresponding stylus, becomes adjustable again.

Figure 2:
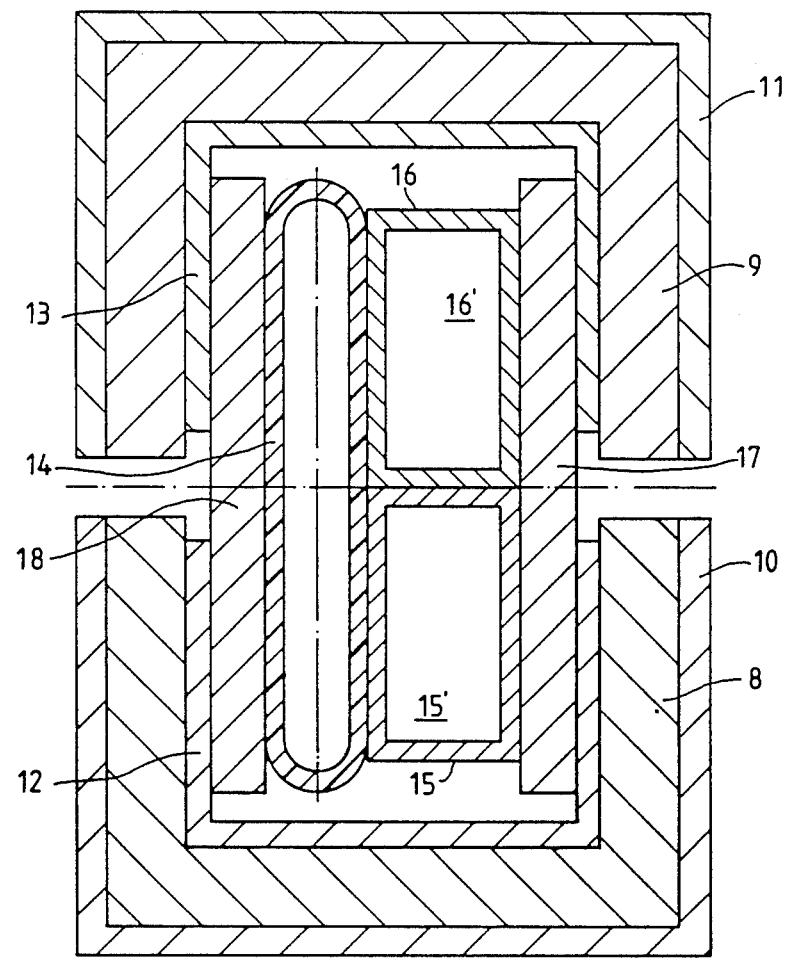
FIG. 2 shows a cross-section of one of the two arms of the measuring device along line II—II in FIG. 1.
Figure 3:
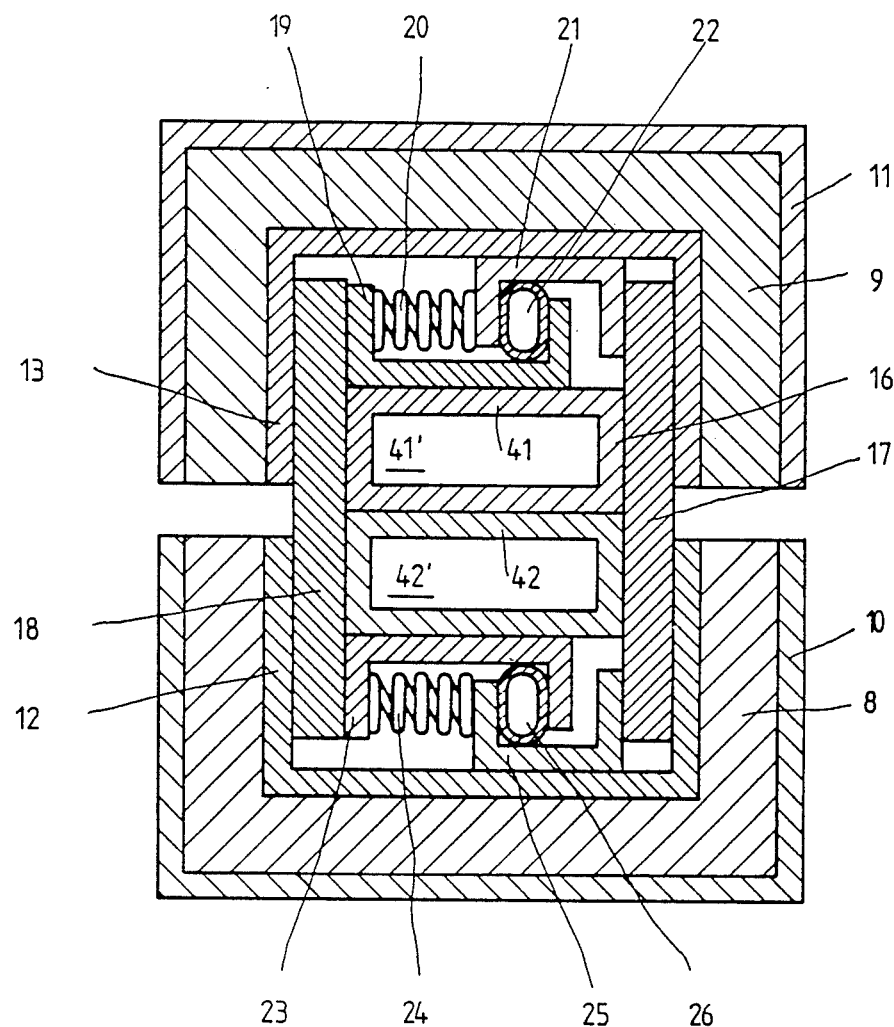
FIG. 3 shows a cross-section according to FIG. 2 of another embodiment of the arms.

Illustrated in FIG. 3 is an arm having parallel rails 8, 9 with a U-shaped profile and which in its central area is designed somewhat different from the embodiment relative to FIG. 2.

Instead of the hollow profile rails 15 and 16 arranged upright, there are two hollow profile rails 41 and 42 with channels 41' and 42', respectively, provided here, arranged with their long sides of the profile cross section horizontal. In the hollow space existing between, e.g., the upper rail 9 and pressure bars 17 and 18 there are two U-profile rails 19 and 21 arranged inversely to each other so as to overlap with one of their shanks. Contained between the overlapping shanks of the U-profile rails 19 and 21 is a pressure hose 22. The corresponding parts for the lower rail 8 are the U-profile rails 23 and 25 and the pressure hose 26. Additionally provided is also a spring 20 and 24, respectively, for stressing the two U-profile rails relative to each other or for immobilizing them against the pressure bars 17 and 18.

As the pressure hose 22 or 26 is relieved of the pressure medium (for instance a pressure fluid or pressure gas), the spring 20 or 24 forces the U-profile rails 19, 21 or 23, 25 on the pressure bars 17 and 18. As a result, the rails 8 and 9 are then immobilized relative to each other through the friction linings 12 and 13, respectively. As the pressure hoses 22 and 26 are pressurized, the effect of the spring force is lifted allowing the arms to swivel, with a very slight relative movement occurring between the pressure bars 17 and 18 and the rails 8 and 9. Once the new measuring position has been reached, pressure medium is relieved from the pressure hoses 22 and 26, making the two rails 8 and 9 again rigid and immovable relative to each other.

A cooling or heating agent is passed through the channels 15', 16' or 41', 42' of the hollow profile rails 15, 16 or 41, 42, the agent being preferably liquid but may as well be gaseous, so that the rails 8, 9 remain at a relatively constant temperature, due to the use of copper as a good heat conductor for the liner 12, 13 of the rails 8 or 9 and for the pressure bars 17 and 18.

The hollow profile rails 15, 16 or 41, 42 are preferably held in position by not illustrated projections on the pressure bars 17 and 18, securing them from sliding down. It is possible also to use only a single hollow profile bar which due to an internal partition features two separate axial channels—, although the embodiment discussed above comprises two arms 4 and 5, it is well known that one arm can also be used to determine the radius or diameter of roll C. Because the cross section of of roll C is circular and therefore rotationally symmetrical, one measuring device positioned on one arm is sufficient to measure the radius differences, and therefore the diameter differences as well, using the center of the roll C as the reference point.

What is claimed is:

1. In a measuring apparatus for measuring the diameter of a rotationally symmetric body having a peripheral surface, said measuring apparatus having at least one straight-line arm having a free end and supporting on said free end measuring means, including a stylus for scanning said peripheral surface, for measuring the diameter of said body, said arm including at least two rails disposed parallel to each other and joined together to form part of a jointed parallelogram serving to set the stylus on and lift the stylus from said peripheral surface, the improvement comprising means for locking the rails of the arm against movement relative to each other, said locking means including at least one pressure hose actuated by a pressure medium.

2. Measuring apparatus according to claim 1, in which said locking means includes springs.

3. Measuring apparatus according to claim 2, in which said locking means includes locking components and at least one centrally located hollow-profile rail having axially directional channels serving as a positioning element for the locking components.

4. Measuring apparatus according to claim 1, in which said locking means includes springs provided for locking the rails and pressure hoses actuated by a pressure medium provided for unlocking the rails.

5. Measuring apparatus according to claim 4, in which said locking means includes pressure bars that extend parallel with the rails for engaging faces of the two rails of an arm, wherein said pressure bars are at least in the locked condition an integral part of both rails of the arm.

6. Measuring apparatus according to claim 4, in which said locking means includes locking components and at least one centrally located hollow-profile rail having axially directional channels serving as a positioning element for the locking components.

7. Measuring apparatus according to claim 4, in which said arm is hollow and includes in longitudinal direction channels which have an inlet and an outlet for a fluid medium.

8. Measuring apparatus according to claim 1 in which said locking means includes pressure bars that extend parallel with the rails for engaging faces of the two rails of an arm, wherein said pressure bars are at least in the locked condition an integral part of both rails of the arm.

9. Measuring apparatus according to claim 2, in which said locking means includes pressure bars that extend parallel with the rails for engaging faces of the two rails of an arm, wherein said pressure bars are at least in the locked condition an integral part of both rails of the arm.

10. Measuring apparatus according to claim 8, in which the two rails of the arm are U-shaped in cross sectional profile, the open sides of the U-profiles face each other and two pressure bars are provided, each pressure bar overlapping two opposed shanks of the U-profiles.

11. Measuring apparatus according to claim 8, in which said locking means includes locking components and at least one centrally located hollow-profile rail having axially directional channels serving as a positioning element for the locking components.

12. Measuring apparatus according to claim 11, in which between the hollow profile rail, the pressure bars and the respective rail there are provided: two U-profile rails, with one leg of one U-profile rail overlapping one leg of the other U-profile rail, and between the two legs, gripping one over each other, a pressure hose is positioned and between that leg of the one rail and the other leg of the other U-profile rail a pressure spring is positioned.

13. Measuring apparatus according to claim 8, in which said arm is hollow and includes in longitudinal direction channels which have an inlet and an outlet for a fluid medium.

14. Measuring apparatus according to claim 1, in which said locking means includes locking components and at least one centrally located hollow-profile rail having axially directional channels serving as a positioning element for the locking components.

15. Measuring apparatus according to claim 1, in which said arm is hollow and includes in longitudinal direction channels which have an inlet and an outlet for a fluid medium.

16. Measuring apparatus according to claim 1, including two said arms wherein one arm each is provided above and below the roll, overlapping the latter approximately up to the highest or lowest point of its peripheral surface.

17. A measuring apparatus according to claim 1 including two said arms wherein one arm each is provided on diametrically opposite sides of the roll.

* * * * *